Patented June 24, 1924.

1,498,833

UNITED STATES PATENT OFFICE.

HENRIK BULL, OF BERGEN, NORWAY, ASSIGNOR TO A/S DE NORSKE SALTVERKER, OF BERGEN, NORWAY.

PROCESS FOR THE PRODUCTION OF MAGNESIUM CHLORIDE.

No Drawing. Application filed June 5, 1922. Serial No. 566,150.

*To all whom it may concern:*

Be it known that I, HENRIK BULL, a subject of the King of Norway, residing at Bergen, Norway, have invented certain new and useful Improvements in Processes for the Production of Magnesium Chloride; and I do hereby declare the following to be a full, clear, and exact description of the invention, such as will enable others skilled in the art to which it appertains to make and use the same.

This invention has for its object a process for the production of anhydrous magnesium chloride by reacting upon magnesia with chlorine gas in the presence of a carbonaceous material.

It is known to produce metal chlorides by passing chlorine gas in contact with a mixture of metal oxide and carbonaceous material, the oxygen of the metal oxide in this case entering into combination with the carbon forming carbon dioxide.

According to a known method of producing magnesium chloride chlorine gas is introduced into a mixture of magnesium oxide and coke at a temperature (700–900° C.) which is sufficiently high to allow the resulting magnesium chloride to remain in a molten condition during the entire chlorination operation. During the chlorination operation therefore the oxide will be in suspension in the fused chloride. It is obvious therefore that the conditions are very bad for the absorption of the gas.

The present invention has for its object a process in which chlorine is introduced into a charge comprising carbon and magnesium oxide at a temperature at which the resulting magnesium chloride does not melt. When the operation is carried into effect in this manner and more especially when the solid materials of the charge are in a finely divided condition absorption of the gas takes place with great readiness. In carrying out the process under the stated conditions the important observation has been made that the reaction will start at a temperature of about 300° C.

The fusion point of the anhydrous magnesium chloride being about 660° C. there is still a considerable temperature interval within which the reaction can be effected without fusion or sintering taking place. It is a necessary condition that sintering is avoided because the sintered material will resist the continued action of the chlorine.

As a matter of fact chlorine acts exothermically upon magnesia while oxygen is liberated and the evolution of heat is quite small. However, when carbon is present and this combines with the liberated oxygen, the reaction is strongly exothermic so that a large amount of heat is evolved.

When the process is carried into effect on a small scale in the laboratory and chlorine is introduced into the reaction mixture contained in a vertical porcelain tube heated to about 300 or 400° C. it is possible to prevent fusion or sintering by maintaining a slow current of gas. When the process is carried out in a manufacturing scale fusion can be avoided by maintaining the charge in motion by suitable mechanical means. The result may for example be attained by making use of a revolving converter. The convertor is charged with a suitable proportion of finely divided magnesium oxide and coke or other carbonaceous material, whereupon the convertor is revolved and heated to 300°C. or more. Chlorine introduced into the convertor will be rapidly absorbed and sufficient heat will be produced to make further supply of heat unnecessary to maintain the required reaction temperature. To prevent the temperature from rising too high, fresh quantities of charge is suitably introduced during the reaction.

To ensure the required overturning of the materials in the convertor so that the chlorine gas is constantly distributed over new portions of charge and no local overheating taking place, it is suitable to make the convertor revolve about a horizontal or inclined axis. In the first named instance the convertor may be given the form of a tube in which chlorine gas in introduced at one end while the escaping gases leave the tube at the other end. When the convertor revolves about an inclined axis, the gases are caused to escape at the upper end of the convertor.

The convertor is conveniently constructed with an outer shell of cast iron, having a lining of refractory magnesite bricks carefully united by means of a refractory mortar. It is possible to control the temperature in the convertor by adjusting the velocity with which the chlorine gas is introduced.

When the process is carried into effect care should be taken that the constituents of the charge magnesium oxide and carbon are quite dry. If magnesium hydroxide is present, this will result in the formation of hydrochloric acid, which escapes and involves an additional consumption of chlorine at the same time as the water liberated involves an increased consumption of carbon.

As a carbonaceous material coke, petroleum, charcoal, etc., may be employed. It is of importance that the carbonaceous materials are well freed from gas, that is, thoroughly heated, because otherwise they contain hydrocarbons, which gives rise to the formation of a great proportion of hydrochloric acid, which is to be considered as a loss.

An important novel feature of the present process consists therein that the formation of the magnesium chloride takes place at a temperature, which is considerably below the sintering or melting point. The fact that chlorination can be effected at such a temperature has not hitherto been known and involves the great advantage that the chlorine gas absorption takes place with much greater readiness than when a fused reaction charge is employed according to known methods. It is well known that absorption takes place more readily in a pulverulent charge, but in the present process another fact of a chemical character plays an important part, viz, the fact that the oxygen liberated by chlorine and magnesia presumably in the first moment unites with the carbon present, forming carbon monoxide. This substance according to my experiments with chlorine in the presence of carbon at the temperature in question is able to form carbonyl chloride, which rapidly reacts with magnesium oxide forming magnesium chloride and carbon dioxide. In these reactions the comparatively low reaction temperature is of importance, because carbonyl chloride at 700° C. and more especially at still higher temperatures is readily decomposed into chlorine and carbon monoxide. The formation of carbonyl chloride means a considerably increased reaction velocity.

As an important advantage of the process hereinbefore described is to be mentioned, that the difficulties of constructing apparatus (convertors) with sufficient resistance are much less than of constructing apparatus able to resist the action of the strongly reactive anhydrous fused magnesium chloride at temperatures of about 700–900° C.

As is known great quantities of anhydrous magnesium chloride are used in the electrolytic production of magnesium metal, in which chlorine is liberated as such. This chlorine may be employed for the production of new quantities of anhydrous magnesium chloride in the manner above described. The raw materials for the production (magnesia and coke) being cheap, it is made possible by these means to produce magnesium metal at a low cost.

I claim:

1. Process for the production of anhydrous magnesium chloride, which consists in reacting upon magnesium oxide and a carbonaceous material with chlorine gas at a temperature which is below the fusion or sintering temperature of magnesium chloride.

2. Process for the production of anhydrous magnesium chloride which consists in introducing chlorine gas into contact with a mixture of finely divided magnesium oxide and carbonaceous material at from about 300° C. to a maximum temperature below the fusion or sintering temperature of magnesium chloride.

In testimony that I claim the foregoing as my invention, I have signed my name in presence of two subscribing witnesses.

HENRIK BULL.

Witnesses:
 CAY ROLL-HANSEN,
 E. LAMBERTSEN.